Nov. 29, 1966  J. J. FOX  3,288,129
FOOD WARMER

Filed Dec. 4, 1964  2 Sheets-Sheet 1

John J. Fox
INVENTOR.

BY *Clarence A. O'Brien*
*and Harvey B. Jacobson*
Attorneys

Nov. 29, 1966   J. J. FOX   3,288,129
FOOD WARMER
Filed Dec. 4, 1964   2 Sheets-Sheet 2
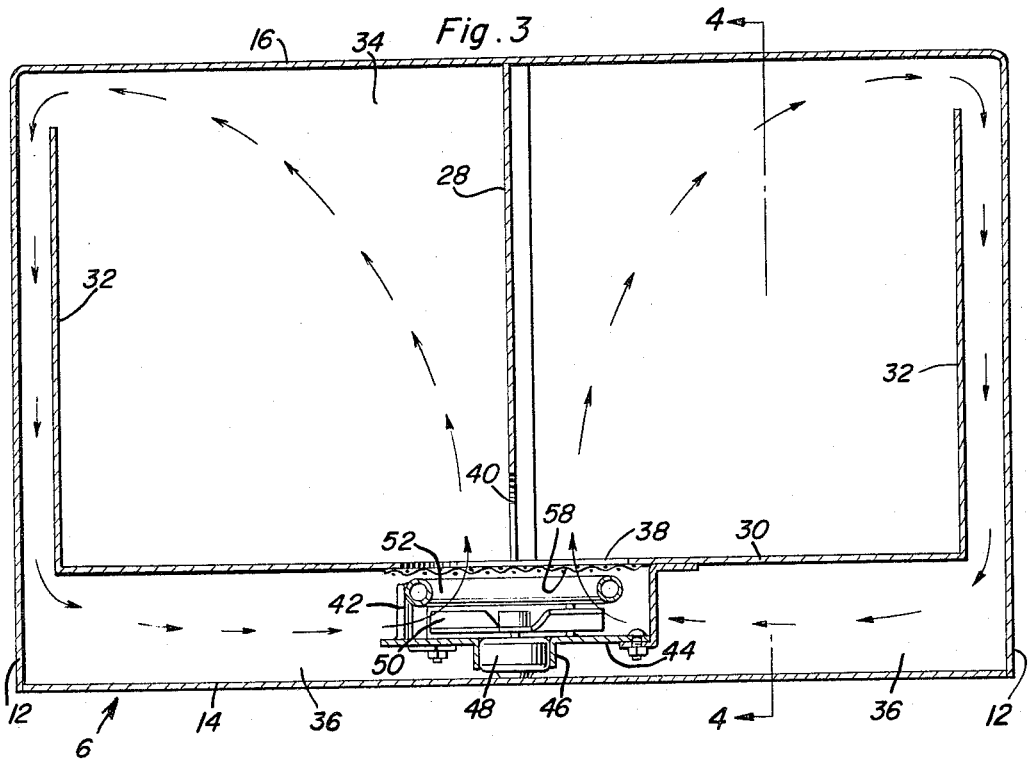
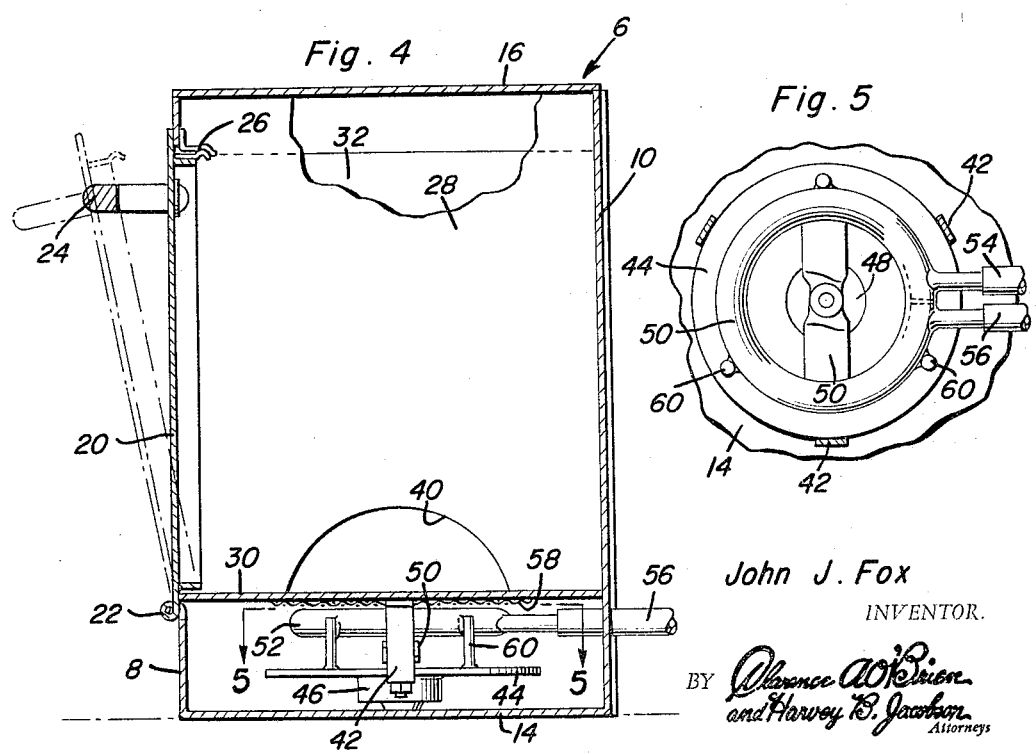
John J. Fox
INVENTOR.

3,288,129
FOOD WARMER
John J. Fox, Box 591, Elizabeth St., Warrenville, Ill.
Filed Dec. 4, 1964, Ser. No. 415,962
8 Claims. (Cl. 126—19.5)

This invention generally relates to new and useful improvements in food warmers particularly for motor vehicles used in the delivery of pizza and other foods, and has for its primary object to provide a device of this character which utilizes the usual liquid heating system of the vehicle as its source of heat.

Another highly important object of the present invention is to provide, in a manner as hereinafter set forth, an improved food warmer of the aforementioned character wherein the heated air is continuously recirculated.

Other objects are to provide a food warmer of the character described which is comparatively simple in construction, strong, durable, compact, of light weight, attractive in appearance, sanitary and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view in vertical longitudinal section through the device on an enlarged scale, taken substantially on the line 3—3 of FIGURE 1;

FIGURE 4 is a view in transverse section, taken substantially on the line 4—4 of FIGURE 3; and FIGURE 5 is a view in horizontal section, taken substantially on the line 5—5 of FIGURE 4.

Figure 1:
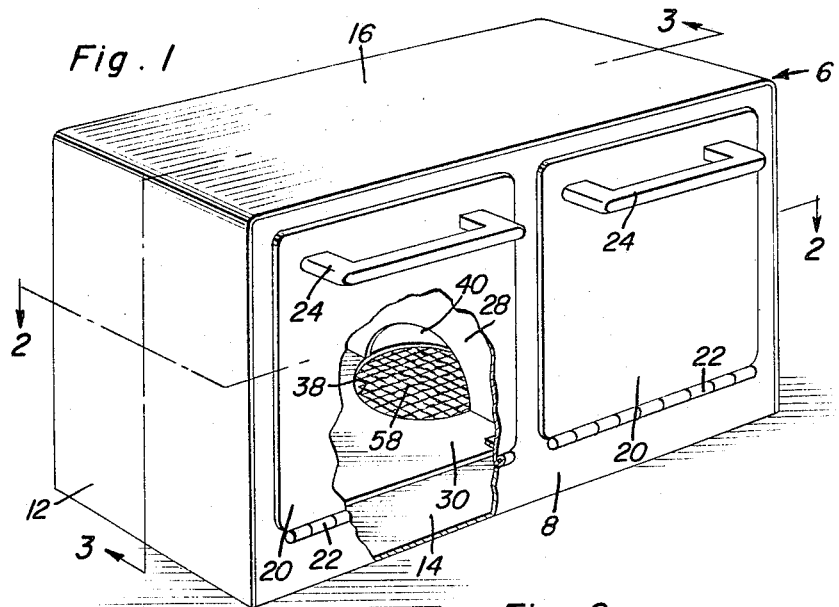
FIGURE 1 is a perspective view of a food warmer constructed in accordance with the present invention, a portion of the front of the device being broken away.
Figure 2:
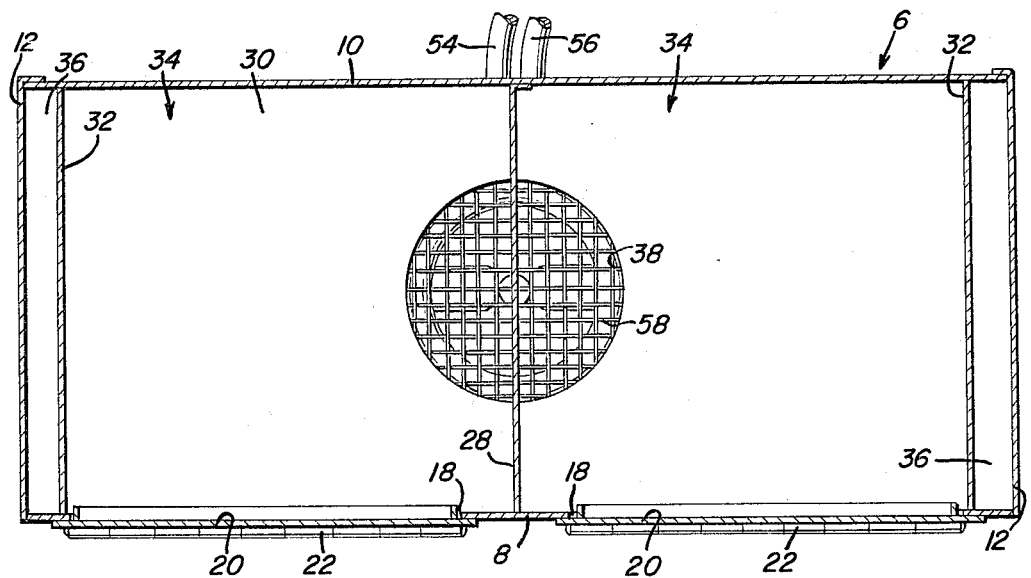
FIGURE 2 is a view in horizontal section on an enlarged scale, taken substantially on the line 2—2 of FIGURE 1.

Referring now to the drawing in detail, it will be seen that the embodiment of the invention which has been illustrated comprises an elongated, substantially rectangular housing or cabinet of suitable dimensions and material which is generally designated by reference numeral 6. The cabinet 6 includes a front wall 8, a back wall 10, end or side walls 12, a bottom wall 14 and a top wall 16. The front wall 8 of the cabinet 6 is provided with a pair of access openings 18. The openings 18 are closed by vertically swinging doors 20. The lower ends of the doors 20 are secured to the cabinet front wall 8 by piano-type hinges 22. Suitable handles 24 are provided on the free upper end portions of the doors 20. Latches 26 secure the doors 20 in closed position.

Mounted at an intermediate point in the cabinet 6 is a transverse vertical partition 28. The vertical partition 28 extends from the top 16 to a point in vertically spaced relation to the bottom 14 of the cabinet 6. Mounted horizontally in the cabinet 6 at the lower end of the vertical partition 28 is a partition 30. As shown in advantages in FIGURE 3 of the drawing, the ends of the horizontal partition 30 are adjacent to but spaced from the side or end walls 12 of the cabinet 6. Vertical baffles 32 are mounted transversely in the end portions of the cabinet 6. The baffles 32 rise from the ends of the horizontal partition 30 and terminate at their upper ends adjacent to but spaced below the top 16 of the cabinet 6. The baffles 32 are adjacent to but spaced from the end walls 12 of the cabinet 6.

The members 28, 30 and 32 provide compartments or chambers 34 in the cabinet 6 to which the doors 20 provide access. The members 30 and 32 also provide air circulating passages 36 in the cabinet 6 for the compartments 34. Toward this end, the horizontal partition 30 is provided with a centrally located circular opening 38 which communicates the passages 36 with the respective compartments 34. Then, the lower end portion of the vertical partition 28 is provided with a substantially semicircular opening or recess 40 which is in communication with the opening 38 and the compartment 34.

Depending from the horizontal partition 30 around the opening 38 is a plurality of hangers 42. A circular platform or the like 44 is mounted on the lower end portions of the hangers 42. In the embodiment shown, the platform 44 includes a depending circular ring or flange 46 defining a circular opening in which a vertical electric motor 48 is mounted. Mounted on the upper end portion of the shaft of the electric motor 48 is a fan or blower 50 which drives air from the passages 36 upwardly through the opening 38 and the compartments 34. Mounted beneath the horizontal partition 30 above the fan 50 and coaxial therewith is an annular tubular heater 52. Delivery and return hoses 54 and 56 connect the heater 52 to the liquid heating system (not shown) of the motor vehicle. A screen 58 is provided for the opening 38.

It is thought that the operation of the device will be readily apparent from a consideration of the foregoing. Briefly, when the electric motor 48 is energized the fan or blower 50 circulates the air in the cabinet 6 through the compartment 34, the passages 36 and the opening 38 as indicated by the arrows in FIGURE 3 of the drawing. Hot water or other liquid from the heating system of the vehicle is circulated through the heater 52 and the hose lines 54 and 56 for warming the circulating air as it is blown upwardly through the opening 38 by the fan 50. Of course, the food to be kept warm is placed in the compartment 34 through the openings 18. If desired, suitable shelves or other supports for the food may be provided in the compartments 34. Legs 60 support the heater 52 on the platform 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A food warmer comprising a cabinet including a top, bottom, and front, back and end walls, a horizontal partition in said cabinet spaced from the bottom and end walls, and a vertical partition extending vertically from said horizontal partition and providing compartments and air circulating passages in the cabinet, said air passages communicating at one end with one end of the compartments, said horizontal partition having an opening therein communicating the other ends of the passages with the other ends of the compartments, and means for circulating heated air through the passages, the opening and the compartments, said cabinet including doors providing access to the compartments, said means including a fan aligned with the opening for blowing air therethrough from the passages and a heater between the fan and the opening, said heater comprising an anuular tube aligned with the opening, and hose lines for connecting said tube to a liquid heating system of a motor vehicle, said vertical partition having a recess in its lower portion communicating with the compartments and the opening.

2. A food warmer comprising an elongated cabinet including a top, a bottom, and front, back and end walls, a horizontal partition in the cabinet spaced from the bottom and the end walls thereof, a vertical partition extending between said horizontal partition and the top, upstanding baffles on the end portions of the horizontal partition spaced from the top and the end walls, said partitions and baffles defining food compartments and air circulating passages in the cabinet, said horizontal partition having an opening therein communicating the compartments with the passages for receiving air therefrom, and means in the cabinet below the horizontal partition for blowing warm air through the opening.

3. The combination of claim 2, said means comprising hangers depending from the horizontal partition around the opening, a platform mounted on said hangers, an electric motor mounted vertically on the platform, a horizontal fan mounted on the motor shaft, and a liquid-heated tubular heater mounted on the platform above the fan.

4. The combination of claim 3, said tubular heater being circular and aligned with the opening, and hose lines connected to the heater for connecting same to a hot liquid heating system of a motor vehicle.

5. The combination of claim 4, said vertical partition having a recess therein communicating with the opening.

6. The combination of claim 2 including a foraminous screen overlying the opening in the horizontal partition.

7. The combination of claim 2 wherein said vertical partition is positioned transversely across the center of the horizontal partition, said opening underlying said vertical partition and extending laterally beyond both sides thereof.

8. A food warmer comprising an elongated cabinet including a top, a bottom, and front, back and end walls, a horizontal partition in the cabinet spaced from the bottom and the end walls thereof, a vertical partition extending between said horizontal partition and the top, upstanding baffles on the end portions of the horizontal partition spaced from the top and the end walls, said partitions and baffles defining food compartments and air circulating passages in the cabinet, said horizontal partition having an opening therein communicating the compartments with the passages for receiving air therefrom, and means in the cabinet for circulating warm air through the passages, the opening and the compartments.

References Cited by the Examiner
UNITED STATES PATENTS

| | | | |
|---|---|---|---|
| 2,408,331 | 9/1946 | Mills. | |
| 3,013,548 | 12/1961 | Thomas | 126—19.5 |
| 3,142,748 | 7/1964 | Warren | 219—394 X |

FOREIGN PATENTS

| | | |
|---|---|---|
| 1,198,612 | 6/1959 | France. |
| 332,874 | 7/1930 | Great Britain. |

CHARLES J. MYHRE, *Primary Examiner.*